United States Patent [19]

Mills et al.

[11] Patent Number: 5,721,945
[45] Date of Patent: Feb. 24, 1998

[54] MICROPROCESSOR CONFIGURED TO DETECT A DSP CALL INSTRUCTION AND TO DIRECT A DSP TO EXECUTE A ROUTINE CORRESPONDING TO THE DSP CALL INSTRUCTION

[75] Inventors: Andrew Mills; Mark A. Ireton; Thomas W. Lynch, all of Austin, Tex.

[73] Assignee: Advanced Micro Devices, Sunnyvale, Calif.

[21] Appl. No.: 643,344

[22] Filed: May 6, 1996

[51] Int. Cl.⁶ ............................................. G06F 9/44
[52] U.S. Cl. ............... 395/800.35; 364/131; 395/500; 395/384; 395/376; 395/589; 395/590
[58] Field of Search ............... 395/500, 200.05, 395/384, 589, 590, 800, 376, 800.35; 364/132, 131

[56] References Cited

U.S. PATENT DOCUMENTS

| | | | |
|---|---|---|---|
| 4,949,241 | 8/1990 | Iwasaki et al. | 395/290 |
| 4,979,102 | 12/1990 | Tokuume | 395/200.43 |
| 5,119,499 | 6/1992 | Tonomura et al. | 395/800.34 |
| 5,193,159 | 3/1993 | Hashimoto et al. | 395/290 |
| 5,577,250 | 11/1996 | Anderson et al. | 395/670 |
| 5,588,118 | 12/1996 | Mandava et al. | 395/800.35 |
| 5,603,047 | 2/1997 | Caulk, Jr. | 395/800.23 |

*Primary Examiner*—Kenneth S. Kim
*Attorney, Agent, or Firm*—Conley, Rose & Tayon, P.C.; B. Noel Kivlin

[57] ABSTRACT

A microprocessor including an instruction decode unit configured to detect a DSP call instruction is provided. The DSP call instruction is indicative of a call to a subroutine which performs a DSP function. Detected DSP call instructions are routed to a DSP which executes a routine performing the corresponding function. Subsequent to the DSP completing execution of the routine, the microprocessor continues execution at the instruction subsequent to the DSP call instruction. If a DSP is not included in the computer system, the DSP call instruction is executed in a manner similar to a subroutine call instruction. The microprocessor subsequently executes a corresponding routine which performs the DSP function.

8 Claims, 5 Drawing Sheets

MICROPROCESSOR CONFIGURED TO DETECT A DSP CALL INSTRUCTION AND TO DIRECT A DSP TO EXECUTE A ROUTINE CORRESPONDING TO THE DSP CALL INSTRUCTION

BACKGROUND OF THE INVENTION

1. Field of the Invention

This invention is related to the field of computer systems and microprocessors and, more particularly, to efficient hardware for executing DSP functions within such computer systems and microprocessors.

2. Description of the Relevant Art

Computer systems employ one or more microprocessors, and often employ digital signal processors (DSPs). The DSPs are typically included within multimedia devices such as sound cards, speech recognition cards, video capture cards, etc. The DSPs function as coprocessors, performing complex and repetitive mathematical computations demanded by multimedia devices and other signal processing applications more efficiently than general purpose microprocessors. Microprocessors are typically optimized for performing integer operations upon values stored within a main memory of a computer system. While DSPs perform many of the multimedia functions, the microprocessor manages the operation of the computer system.

Digital signal processors include execution units which comprise one or more arithmetic logic units (ALUs) coupled to hardware multipliers which implement complex mathematical algorithms in a pipelined manner. The instruction set primarily comprises DSP-type instructions (i.e. instructions optimized for the performance of complex mathematical operations) and also includes a small number of non-DSP instructions. The non-DSP instructions are in many ways similar to instructions executed by microprocessors, and are necessary for allowing the DSP to function independent of the microprocessor.

The DSP is typically optimized for mathematical algorithms such as correlation, convolution, finite impulse response (FIR) filters, infinite impulse response (IIR) filters, Fast Fourier Transforms (FFTs), matrix correlations, and inner products, among other operations. Implementations of these mathematical algorithms generally comprise long sequences of systematic arithmetic/multiplicative operations. These operations are interrupted on various occasions by decision-type commands. In general, the DSP sequences are a repetition of a very small set of instructions that are executed 70% to 90% of the time. The remaining 10% to 30% of the instructions are primarily boolean/decision operations. An exemplary DSP is the ADSP 2171 available from Analog Devices, Inc. of Norwood, Mass.

Unfortunately, many instruction sequences (or "routines") which perform complex mathematical operations are coded in the x86 instruction set. Such mathematical routines often may be more efficiently performed by a DSP. Microprocessors often execute instructions from the x86 instruction set, due to its widespread acceptance in the computer industry. Conversely, DSPs develop instruction sets which are optimized for mathematical operations common to signal processing. Because the instruction set is optimized for performing mathematical routines, it is desirable to determine that a routine may be more efficiently executed in a DSP and to route such a routine to a DSP for execution. It is further desirable to perform such a detection in a manner that allows for the original x86 routine to be executed if a DSP is not included in the computer system.

SUMMARY OF THE INVENTION

The problems outlined above are in large part solved by a microprocessor according to the present invention. The microprocessor includes an instruction decode unit configured to detect a DSP call instruction. The DSP call instruction is indicative of a call to a subroutine which performs a DSP function. Detected DSP call instructions are routed to a DSP which executes a routine performing the corresponding function. Subsequent to the DSP completing execution of the routine, the microprocessor continues execution at the instruction subsequent to the DSP call instruction. Advantageously, the DSP function may be executed in the DSP more efficiently than was previously achievable using microprocessor code within the microprocessor. Performance of a computer system employing the microprocessor and the DSP may be increased due to the efficiencies.

If a DSP is not included in the computer system, the DSP call instruction is executed in a manner similar to a subroutine call instruction. The microprocessor subsequently executes a corresponding routine which performs the DSP function. Advantageously, programs including the DSP call instruction may execute correctly within a computer system which does not include a DSP.

Broadly speaking, the present invention contemplates a microprocessor comprising an instruction cache and an instruction decode unit. The instruction cache is configured to store instructions. Coupled to receive instructions from the instruction cache, the instruction decode unit is configured to detect a DSP call instruction having a target address to route an indication of the DSP call instruction to a digital signal processor.

The present invention further contemplates a computer system comprising a microprocessor and a digital signal processor. The microprocessor is configured to execute instructions including a DSP call instruction. Coupled to receive an indication of the DSP call instruction from the microprocessor, the digital signal processor performs a digital signal processing function indicated by the DSP call instruction.

BRIEF DESCRIPTION OF THE DRAWINGS

Other objects and advantages of the invention will become apparent upon reading the following detailed description and upon reference to the accompanying drawings in which.

Figure 1:
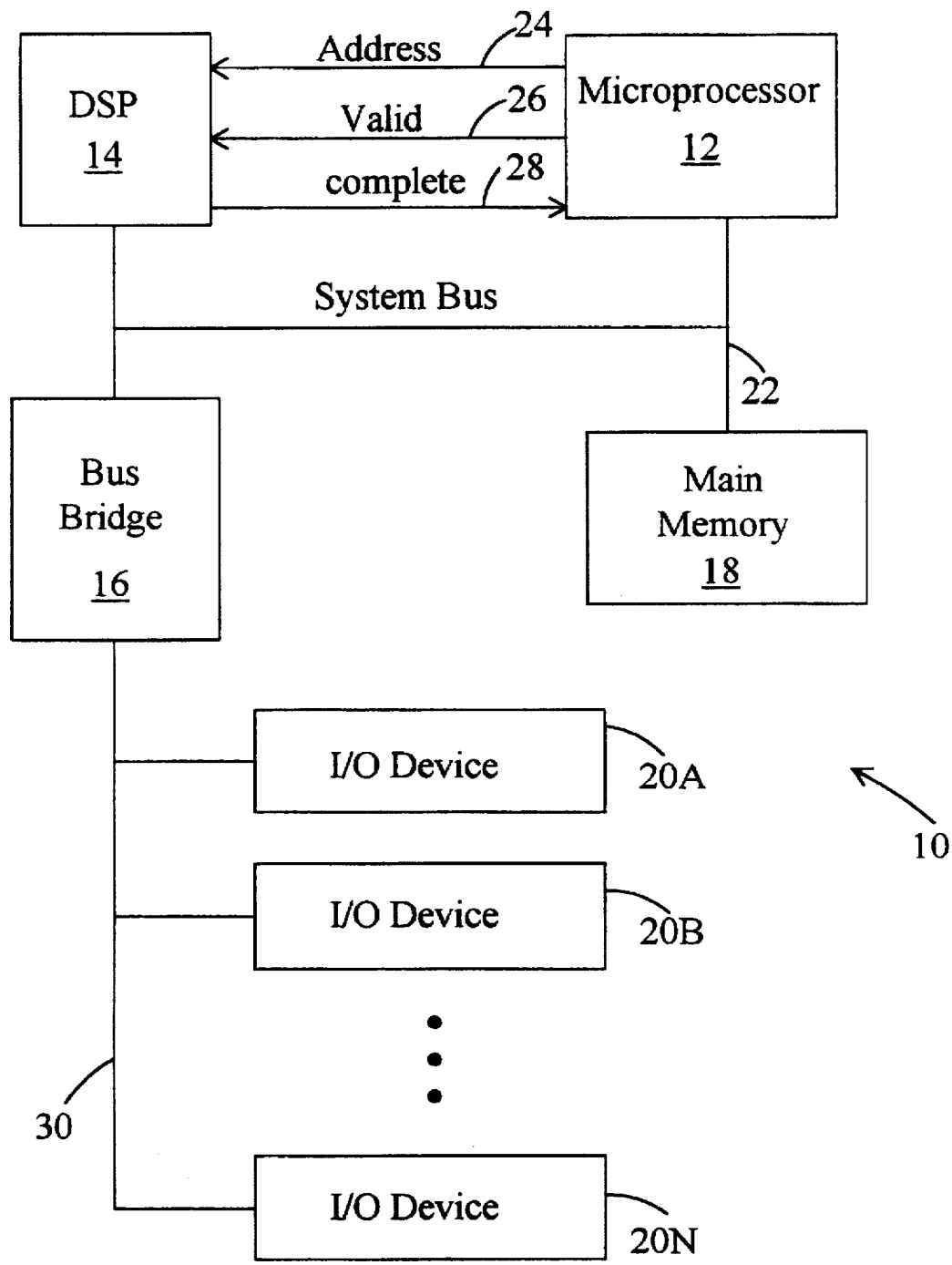
FIG. 1 is a block diagram of a computer system including a microprocessor and a digital signal processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, one embodiment of a computer system 10 is shown. Computer system 10 includes a microprocessor 12, a DSP 14, a bus bridge 16, a main memory 18, and a plurality of input/output (I/O) devices 20A–20N (collectively referred to as I/O devices 20). A system bus 22 couples microprocessor 12, DSP 14, bus bridge 16, and main memory 18. Additionally, microprocessor 12 and DSP 14 are coupled together via an address bus 24, a valid conductor 26, and a complete conductor 28. I/O devices 20A–20N are coupled to bus bridge 16 via an I/O bus 30.

Generally speaking, microprocessor 12 includes circuitry for detecting a DSP call instruction. The DSP call instruction is indicative of a call to a routine performing a DSP function. The DSP call instruction includes a target address which indicates which DSP function is being requested. When a DSP call instruction is detected, microprocessor 12 transmits the target address to DSP 14 upon address bus 24. Additionally, a signal upon valid conductor 26 is asserted to indicate that an address is being conveyed. DSP 14 receives the address, and executes a routine stored therein corresponding to the x86 instructions residing at the target address. Subsequent to the completion of the routine, DSP 14 asserts a signal upon complete conductor 28. Microprocessor 12 may then continue instruction execution with the instruction subsequent to the DSP call instruction. Advantageously, DSP functions are performed within DSP 14 instead of microprocessor 12. Performance of the computer system may be increased by the more efficient execution of the DSP routine.

As used herein, the term "DSP function" refers to a function which DSPs are optimized to perform, but that microprocessors are not typically optimized to perform. DSP functions may include complex mathematical functions such as correlations, convolutions, finite impulse response (FIR) filters, infinite impulse response (IIR) filters, Fast Fourier Transforms (FFTs), matrix correlations, and inner products. Additional mathematical functions may be performed by DSP 14 as well. These mathematical functions have in common a repetitive multiply and accumulate function in which a pair of operands are multiplied and the product is added to a third operand, which is often the accumulation of prior multiplications.

Subroutine call instructions are used to switch instruction dispatch and execution to a code sequence residing in memory at a target address supplied by the subroutine call instruction. Additionally, subroutine call instructions store the address of the instruction subsequent to the subroutine call instruction. At the conclusion of the subroutine code sequence, a corresponding subroutine return instruction may be executed. The subroutine return instruction uses the sequential address stored by the most recently executed call instruction as a target address. In this manner, subroutines may be performed by the microprocessor. The same subroutine may be executed from different locations within a code sequence, and the subroutine call and subroutine return instructions cause correct transition from the point at which the subroutine call instruction is executed to the subroutine and from the subroutine to the instruction subsequent to the subroutine call instruction. An exemplary subroutine call instruction is the CALL instruction of the x86 microprocessor architecture. The CALL instruction pushes the sequential address onto a stack data structure defined by the x86 microprocessor architecture, and branches to the target address. In one embodiment, microprocessor 12 detects a previously undefined x86 opcode as a DSP call instruction. The DSP call instruction operates as a subroutine call instruction, except that microprocessor 12 may route the target address to DSP 14 instead of executing x86 instructions at the target address.

A programmer may choose to code a DSP call instruction instead of a typical subroutine call instruction if the routine to be called may be beneficially performed by DSP 14. The programmer then codes the routine using the instruction set of microprocessor 12, and these instructions are stored into memory at the target address of the DSP call instruction. If DSP 14 is not present in computer system 10, then the microprocessor executes the routine coded in the microprocessor instruction set. In addition, the programmer codes the routine utilizing DSP 14's instructions. This routine is made available to DSP 14 in some fashion. For example, the routine may be loaded into DSP 14 when computer system 10 is powered on, or is permanently stored within DSP 14. If a DSP call instruction is executed by microprocessor 12 in a computer system 10 including DSP 14, then DSP 14 executes the routine coded in DSP 14's instruction set.

In addition to subroutine call instructions, microprocessor 12 executes other instructions and operates upon data. The data and instructions are typically stored in main memory 18. Microprocessor 12 is configured to communicate with I/O devices 20 through bus bridge 16.

In one embodiment, DSP 14 includes a digital signal processing core similar to the ADSP-2171 from Analog Devices, Inc. Additionally, DSP 14 includes circuitry for receiving the address upon address bus 24 when the valid signal upon valid conductor 26 is asserted. The address is used as an index into a program memory within DSP 14, and a routine stored therein is executed. At the conclusion of the routine, DSP 14 asserts a signal upon complete conductor 28 to indicate completion. DSP 14 may perform bus transactions upon system bus 22 to retrieve data to be operated upon from main memory 18, in one embodiment. In another embodiment, DSP 14 is coupled to a memory from which it retrieves operands. In yet another embodiment, DSP 14 is included within an I/O device 20 upon I/O bus 30. It is noted that routines may be stored into the program memory of DSP 14 when computer system 10 is powered on, or the routines may be permanently stored into a read-only memory (ROM) forming the program memory. Still further, routines may be stored into the program memory when the program using the DSP call instruction is executed.

Bus bridge 16 is provided to assist in communications between I/O devices 20 and devices coupled to system bus 22. I/O devices 20 typically require longer bus clock cycles than microprocessor 12 and other devices coupled to system bus 22. Therefore, bus bridge 16 provides a buffer between system bus 22 and input/output bus 30. Additionally, bus bridge 16 translates transactions from one bus protocol to another. In one embodiment, input/output bus 30 is an Enhanced Industry Standard Architecture (EISA) bus and bus bridge 16 translates from the system bus protocol to the EISA bus protocol. In another embodiment, input/output bus 30 is a Peripheral Component Interconnect (PCI) bus and bus bridge 16 translates from the system bus protocol to the PCI bus protocol. It is noted that many variations of system bus protocols exist. Microprocessor 12 may employ any suitable system bus protocol.

I/O devices 20 provide an interface between computer system 10 and other devices external to the computer system. Exemplary I/O devices include a modem, a serial or parallel port, a sound card, etc. An exemplary modem may include an analog front end arrangement, or a complete data pump having an analog front end. I/O devices 20 may also be referred to as peripheral devices. Main memory 18 stores data and instructions for use by microprocessor 12. In one embodiment, main memory 20 includes at least one Dynamic Random Access Memory (DRAM) cell and a DRAM memory controller.

It is noted that although computer system 10 as shown in FIG. 1 includes one microprocessor, other embodiments of computer system 10 may included multiple microprocessors similar to microprocessor 12. It is further noted that the above discussion refers to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

Figure 2:
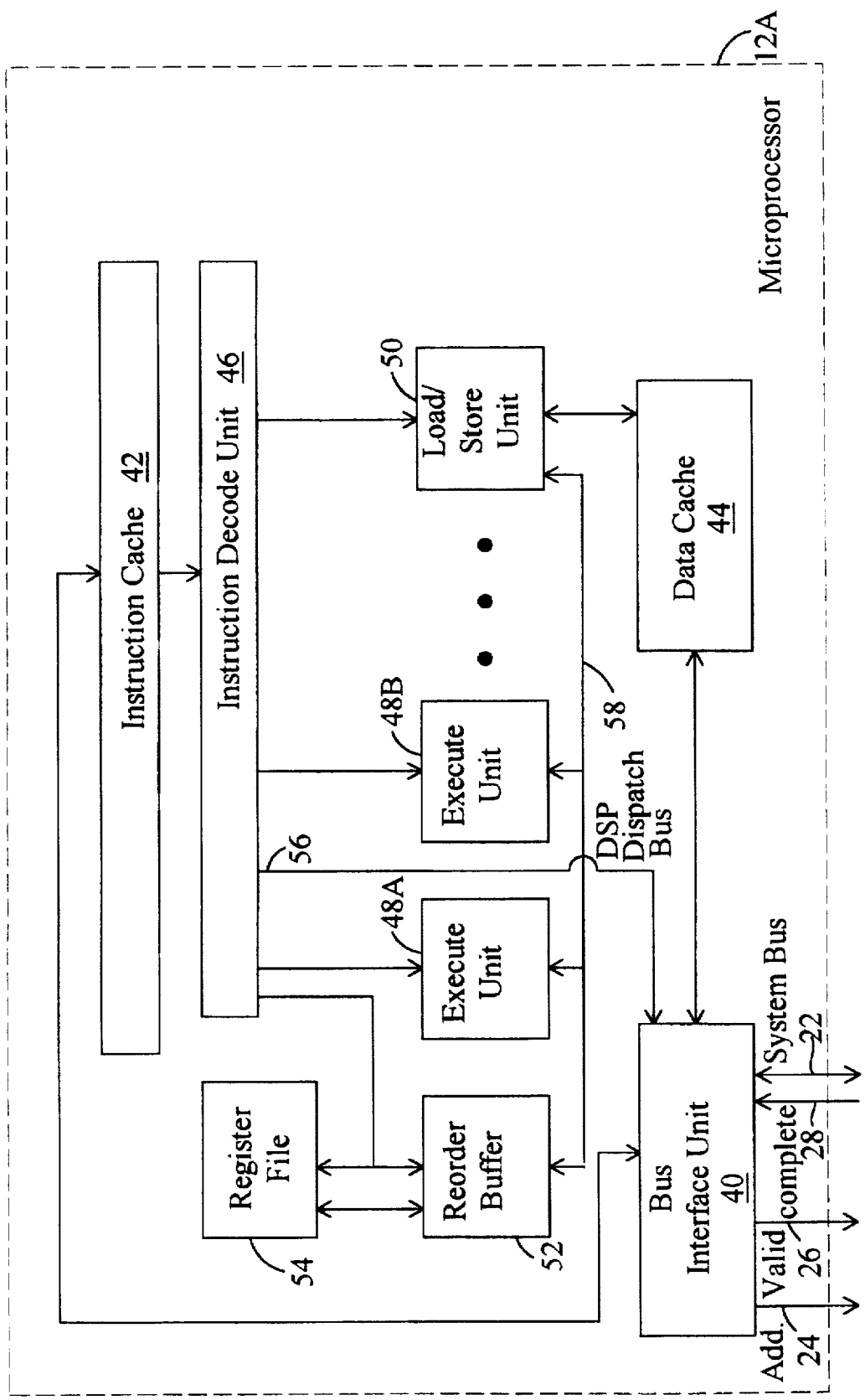
FIG. 2 is a block diagram of one embodiment of the microprocessor shown in FIG. 1, including an instruction decode unit.

Turning now to FIG. 2, one embodiment of microprocessor 12 (microprocessor 12A) is shown. Microprocessor 12A includes a bus interface unit 40, an instruction cache 42, a data cache 44, an instruction decode unit 46, a plurality of execute units including execute units 48A and 48B, a load/store unit 50, a reorder buffer 52, and a register file 54. The plurality of execute units will be collectively referred to herein as execute units 48. Bus interface unit 40 is coupled to a DSP dispatch bus 56, which is further coupled to instruction decode unit 46. Additionally, bus interface unit 40 is coupled to instruction cache 42 and data cache 44. Address bus 24, valid conductor 26, complete conductor 28, and system bus 22 are coupled to bus interface unit 40. Instruction cache 42 is coupled to instruction decode unit 46, which is further coupled to execute units 48, reorder buffer 52, and load/store unit 50. Reorder buffer 52, execute units 48, and load/store unit 50 are each coupled to a forwarding bus 58 for forwarding of execution results. Load/store unit 50 is coupled to data cache 44.

Generally speaking, instruction decode unit 46 is configured to detect DSP call instructions. If such an instruction is detected, instruction decode unit 46 transmits the corresponding target address to bus interface unit 40 upon DSP dispatch bus 56. Upon receipt of a target address upon DSP dispatch bus 56, bus interface unit 40 transmits the target address upon address bus 24 and asserts a signal upon valid conductor 26. Microprocessor 12A then stalls subsequent instruction dispatch until a signal upon complete conductor 28 is asserted, indicating that the routine identified by the target address has been completed by DSP 14. Advantageously, the DSP function embodied within the identified routine may be executed more efficiently in the DSP than in microprocessor 12A. When the complete signal is received, instruction dispatch and execution continues at the instruction subsequent to the DSP call instruction.

If DSP 14 is not included in a computer system, instruction decode unit 46 dispatches DSP call instructions to execute units 48. Execute units 48 execute the DSP call instruction as a subroutine call instruction, causing instructions to be fetched from the target address. In this manner, the original x86 routines implementing the requested DSP function are executed. Although less efficient than the execution of a corresponding routine in DSP 14, the program executes correctly. Advantageously, the presence or absence of DSP 14 does not affect the correct operation of the program. The presence of DSP 14 may be detected via a configuration registers within the microprocessor, or via the state of an external pin to the microprocessor. Instruction decode unit 46 may thereby detect the presence of DSP 14 and handle the DSP subroutine call instruction appropriately.

Instruction cache 42 is a high speed cache memory for storing instructions. It is noted that instruction cache 42 may be configured into a set-associative or direct mapped configuration. Instruction cache 42 may additionally include a branch prediction mechanism for predicting branch instructions as either taken or not taken. A "taken" branch instruction causes instruction fetch and execution to continue at the target address of the branch instruction. A "not taken" branch instruction causes instruction fetch and execution to continue at the instruction subsequent to the branch instruction. Instructions are fetched from instruction cache 42 and conveyed to instruction decode unit 46 for decode and dispatch to an execution unit.

As noted above, instruction decode unit 46 detects DSP call instructions. Additionally, instruction decode unit 46 decodes each instruction fetched from instruction cache 42. Instruction decode unit 46 dispatches the instruction to execute units 48 and/or load/store unit 50. Instruction decode unit 46 also detects the register operands used by the instruction and requests these operands from reorder buffer 52 and register file 54. In one embodiment, execute units 48 are symmetrical execution units. Symmetrical execution units are each configured to execute a particular subset of the instruction set employed by microprocessor 12A. The subsets of the instruction set executed by each of the symmetrical execution units are the same. In another embodiment, execute units 48 are asymmetrical execution units configured to execute dissimilar instruction subsets. For example, execute units 48 may include a branch execute unit for executing branch instructions, one or more arithmetic/logic units for executing arithmetic and logical instructions, and one or more floating point units for executing floating point instructions. Instruction decode unit 46 dispatches an instruction to an execute unit 48 or load/store unit 50 which is configured to execute that instruction.

Load/store unit 50 provides an interface between execute units 48 and data cache 44. Load and store memory operations are performed by load/store unit 50 to data cache 44. Additionally, memory dependencies between load and store memory operations are detected and handled by load/store unit 50.

Execute units 48 and load/store unit 50 may include one or more reservation stations for storing instructions whose operands have not yet been provided. An instruction is selected from those stored in the reservation stations for execution if: (1) the operands of the instruction have been provided, and (2) the instructions which are prior to the instruction being selected have not yet received operands. It is noted that a centralized reservation station may be included instead of separate reservations stations. The centralized reservation station is coupled between instruction decode unit 46, execute units 48, and load/store unit 50. Such an embodiment may perform the dispatch function within the centralized reservation station.

Microprocessor 12A supports out of order execution, and employs reorder buffer 52 for storing execution results of speculatively executed instructions and storing these results into register file 54 in program order, for performing dependency checking and register renaming, and for providing for mispredicted branch and exception recovery. When an instruction is decoded by instruction decode unit 46, requests for register operands are conveyed to reorder buffer 52 and register file 54. In response to the register operand requests, one of three values is transferred to the execute unit 48 and/or load/store unit 50 which receives the instruction: (1) the value stored in reorder buffer 52, if the value has been speculatively generated; (2) a tag identifying a location within reorder buffer 52 which will store the result, if the value has not been speculatively generated; or (3) the value stored in the register within register file 54, if no instructions within reorder buffer 52 modify the register. Additionally, a storage location within reorder buffer 52 is allocated for storing the results of the instruction being decoded by instruction decode unit 46. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When execute units 48 or load/store unit 50 execute an instruction, the tag assigned to the instruction by reorder buffer 52 is conveyed upon result bus 58 along with the result of the instruction. Reorder buffer 52 stores the result in the indicated storage location. Additionally, execute units 48 and load/store unit 50 compare the tags conveyed upon result bus 58 with tags of operands for instructions stored therein. If a match occurs, the unit captures the result from result bus 58 and stores it with the corresponding instruction. In this manner, an instruction may receive the operands it is intended to operate upon. Capturing results from result bus 58 for use by instructions is referred to as "result forwarding".

Instruction results are stored into register file 54 by reorder buffer 52 in program order. Storing the results of an instruction and deleting the instruction from reorder buffer 52 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 52 discards the instructions subsequent to the mispredicted branch instructions. Instructions thus discarded are also flushed from execute units 48, load/store unit 50, and instruction decode unit 46.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146,382, filed Oct. 29, 1993 by Witt, et al. These documents are incorporated herein by reference in their entirety.

Register file 54 includes storage locations for each register defined by the microprocessor architecture employed by microprocessor 12A. For example, microprocessor 12A may employ the x86 microprocessor architecture. For such an embodiment, register file 54 includes locations for storing the EAX, EBX, ECX, EDX, ESI, EDI, ESP, and EBP register values.

Data cache 44 is a high speed cache memory configured to store data to be operated upon by microprocessor 12A. It is noted that data cache 44 may be configured into a set-associative or direct-mapped configuration.

Bus interface unit 40 is configured to effect communication between microprocessor 12A and devices coupled to system bus 22. For example, instruction fetches which miss instruction cache 42 may be transferred from main memory 18 by bus interface unit 40. Similarly, data requests performed by load/store unit 50 which miss data cache 44 may be transferred from main memory 18 by bus interface unit 40. Additionally, data cache 44 may discard a cache line of data which has been modified by microprocessor 12A. Bus interface unit 40 transfers the modified line to main memory 18.

It is noted that instruction decode unit 46 may be configured to dispatch an instruction to more than one execution unit. For example, in embodiments of microprocessor 12A which employ the x86 microprocessor architecture, certain instructions may operate upon memory operands. Executing such an instruction involves transferring the memory operand from data cache 44, executing the instruction, and transferring the result to memory (if the destination operand is a memory location). Load/store unit 50 performs the memory transfers, and an execute unit 48 performs the execution of the instruction.

Figure 3:
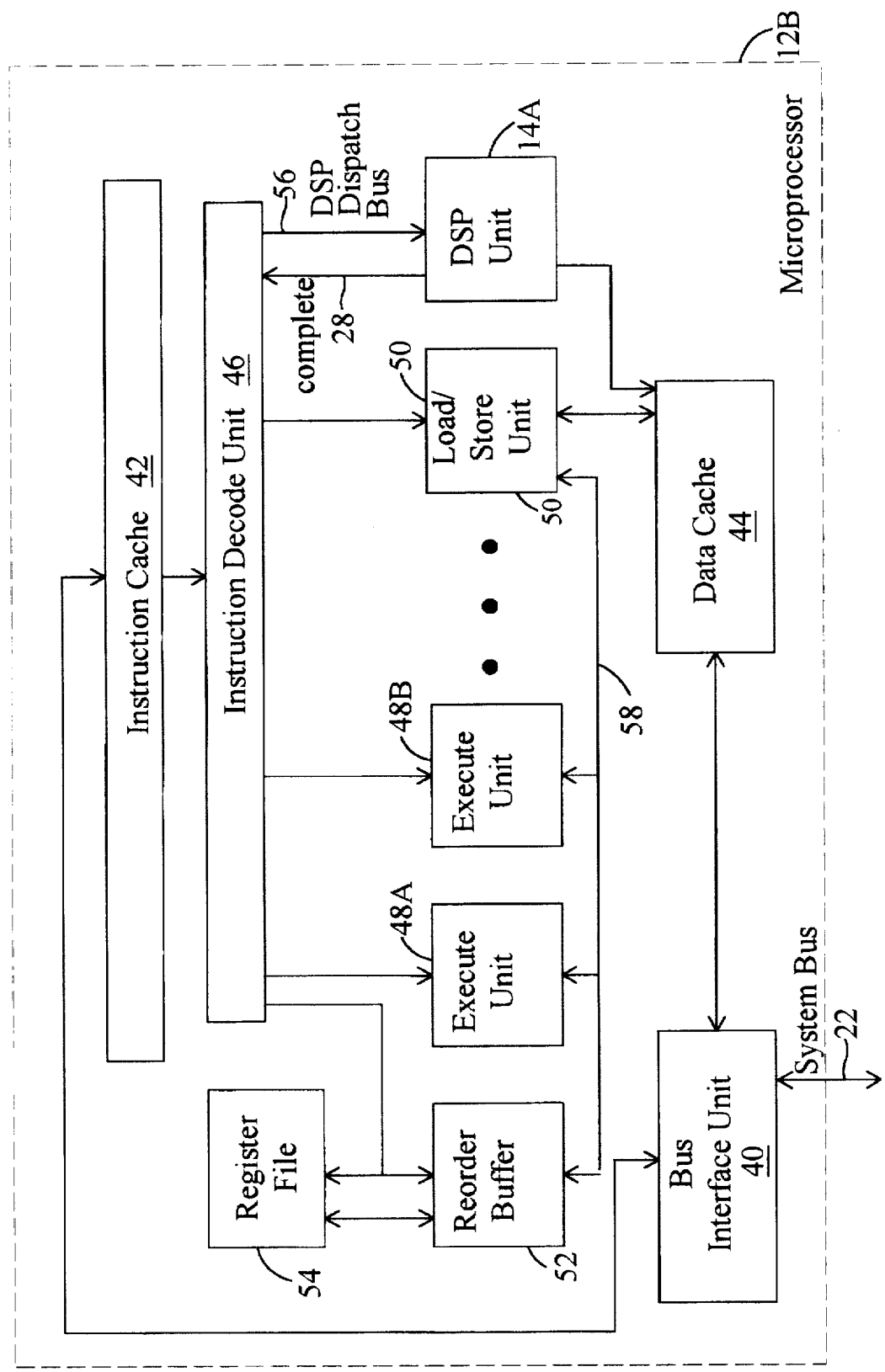
FIG. 3 is a block diagram of another embodiment of the microprocessor shown in FIG. 1, including an instruction decode unit and a DSP unit.

Turning now to FIG. 3, a second embodiment of microprocessor 12 (microprocessor 12B) is shown. Like numbered elements in FIGS. 2 and 3 are similar. In addition to the elements shown in FIG. 2, microprocessor 12B integrates DSP 14 (shown in FIG. 1) as a DSP unit 14A. Bus interface unit 40 includes circuitry for effecting communication upon system bus 22, but does not include busses and conductors for communicating with DSP 14 in this embodiment. Instead, DSP unit 14A and instruction decode unit 46 communicate directly. Advantageously, a computer system equipped with microprocessor 12B may eliminate the separate DSP shown in FIG. 1.

DSP unit 14A may be configured similar to DSP 14. However, DSP unit 14A accepts indications of the DSP function to perform upon DSP dispatch bus 56 from instruction decode unit 46. Once a requested DSP function is complete, DSP unit 14A asserts a signal upon complete conductor 28 to instruction decode unit 46. Additionally, DSP unit 14A may be configured to access data cache 44 for data operands. Data operands may be stored in a memory within DSP unit 14A for quicker access, or may be accessed directly from data cache 44 when needed.

The above discussion describes the target address being conveyed upon address bus 24. It is noted that a portion of the address sufficient for DSP 14 to identify the requested routine may be conveyed. For example, the instruction memory within DSP 14 may store instructions in a plurality of storage locations indexed by the target address. The portion of the address used as the index may be conveyed. Such embodiments are contemplated.

Additional information regarding microprocessors may be found within the commonly assigned, co-pending patent application entitled "High Performance Superscalar Microprocessor", Ser. No. 08/146,382, filed Oct. 29, 1993 by Witt, et al. Further information regarding microprocessors may be found within the commonly assigned, co-pending patent application entitled "Superscalar Microprocessor Including a High Performance Instruction Alignment Unit", Ser. No. 08/377,843, filed Jan. 25, 1995 by Witt, et al. The disclosures of these patent applications are incorporated herein by reference in their entirety.

Figure 4:
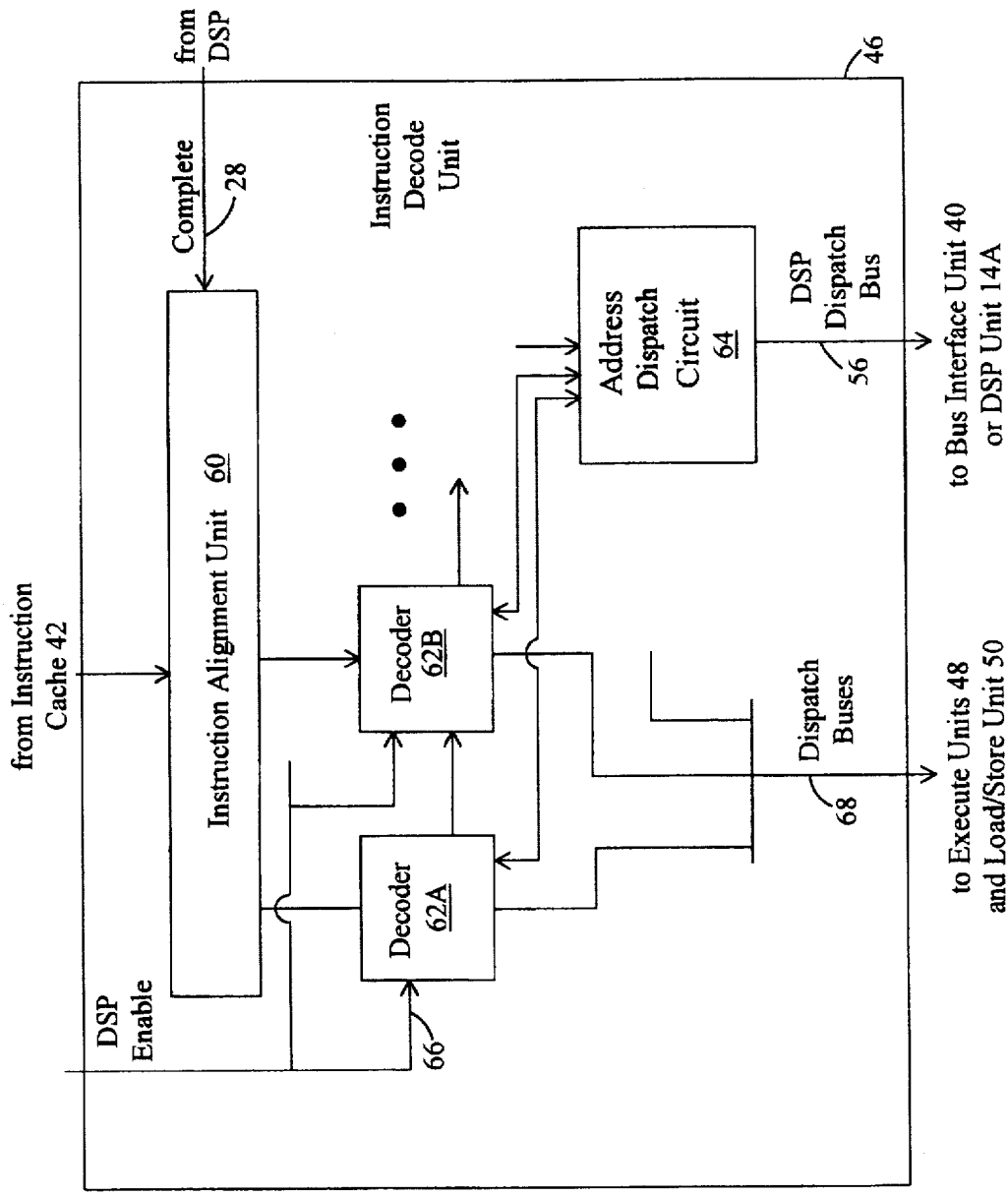
FIG. 4 is a diagram of the instruction decode unit shown in FIGS. 2 and 3.

Turning now to FIG. 4, one embodiment of instruction decode unit 46 is shown. Instruction decode unit 46 includes an instruction alignment unit 60, a plurality of decoder circuits including decoder circuits 62A–62B (collectively referred to as decoder circuits 62), and a DSP dispatch circuit 64. Instruction alignment unit 60 is coupled to receive instructions fetched from instruction cache 42, and to align instructions to decoder circuits 62. Decoder circuits 62 receive a DSP enable signal upon a DSP enable conductor 66. Each decoder circuit 62 decodes the instruction received from instruction alignment unit 60 to determine the register operands manipulated by the instruction as well as the unit to receive the instruction. An indication of the unit to receive the instruction as well as the instruction itself are conveyed upon a plurality of dispatch buses 68 to execute units 48 and load/store unit 50. Other buses, not shown, are used to request register operands from reorder buffer 52 and register file 54.

Decoder circuits 62 decode the DSP call instruction. When a decoder circuit 62 detects the DSP call instruction, the decoder circuit transmits the associated target address to DSP dispatch circuit 64. In one embodiment, the DSP call instruction includes a displacement field which is added to the address of the DSP call instruction to generate the target address. DSP dispatch circuit 64 includes an adder for such an embodiment in order to form the target address, and DSP dispatch circuit 64 receives both the displacement field and the address of the DSP call instruction in order to form the target address. In another embodiment, decoder circuits 62 each include an adder circuit for forming the target address. Still further, the displacement field may be used as an index into a table of target addresses. The target address stored at the index of the displacement field is used as the target address for the DSP call instruction.

DSP dispatch circuit 64 conveys the target address upon DSP dispatch bus 56 to bus interface unit 40 (in microprocessor 12A) or DSP unit 14A (in microprocessor 12B). Instructions subsequent to the DSP call instruction are stalled until the complete signal upon complete conductor 28 (coupled to instruction alignment unit 60) is asserted. If more than one decoder circuit 62 detects a DSP call instruction concurrently, then DSP dispatch circuit 64 selects the instruction which is first in program order for conveyance upon DSP dispatch bus 56. It is noted that, in one embodiment, an instruction received by decoder circuit 62A is prior to an instruction concurrently received by decoder circuit 62B in program order. Similar relationships exist between other decoder circuits 62.

It is noted that multiple DSPs may be included within microprocessor 12 or computer system 10. The DSPs may be configured to store different routines corresponding to different target addresses. In this case, microprocessor 12 may be configured to store a programmable target address range for each DSP. When a DSP call instruction is detected, the target address is compared to the programmable target address ranges to determine which of the multiple DSPs is to execute the corresponding routine.

Decoder circuits 62 receive a DSP enable indication. If the DSP enable indication indicates that DSP 14 or 14A is enabled, then decoder circuits 62 detect DSP call instructions and convey the instructions to DSP dispatch circuit 64 (as described above). However, if the DSP enable indication indicates that DSP 14 or 14A is disabled, then decoder circuits 62 decode the DSP call instructions as typical subroutine call instructions. The instructions are subsequently executed, causing a branch to a subroutine of x86 instructions implementing the DSP function. In this manner, the functionality performed by the DSP is performed by microprocessor 12. The DSP enable value may indicate disablement for microprocessor 12A if DSP 14 is not included in the computer system, for example. In one embodiment, a configuration register (not shown) within microprocessor 12 stores the DSP enable value. In an embodiment of microprocessor 12A, an external pin conveys the DSP enable value according to whether or not DSP 14 is included in the computer system.

Each of decoder circuits 62 is configured to convey an instruction upon one of dispatch buses 68, along with an indication of the unit or units to receive the instruction. In one embodiment, a bit is included within the indication for each of execute units 48 and load/store unit 50. If a particular bit is set, the corresponding unit is to execute the instruction. If a particular instruction is to be executed by more than one unit, more than one bit in the indication may be set.

Instruction alignment unit 60 is included to route instructions to decoder circuits 62. In one embodiment, instruction alignment unit 60 includes a byte queue in which instruction bytes fetched from instruction cache 42 are queued. Instruction alignment unit 60 locates valid instructions from within the byte queue and dispatches the instructions to respective decoder circuits 62. In another embodiment, instruction cache 42 includes predecode circuitry which predecodes instruction bytes as they are stored into instruction cache 42. Start and end byte information indicative of the beginning and end of instructions is generated and stored within instruction cache 42. The predecode data is transferred to instruction alignment unit 60 along with the instructions, and instruction alignment unit 60 transfers instructions to the decoder circuits 62 according to the predecode information. Instruction alignment unit 60 may be configured similar to the disclosure of the commonly assigned, co-pending patent application entitled: "A High Speed Instruction Alignment Unit for a Superscalar Microprocessor", Ser. No. 08/421,669, filed Apr. 12, 1995 by Johnson, et al. The disclosure of this patent application is incorporated herein by reference in its entirety.

Figure 5:
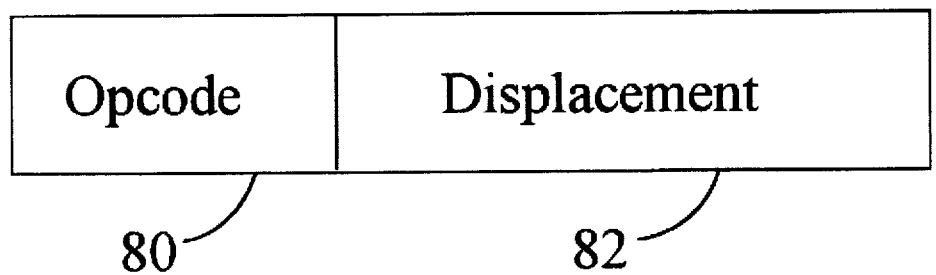
FIG. 5 is a diagram of a subroutine call instruction.

Turning now to FIG. 5, a diagram of a DSP call instruction for use in the x86 microprocessor architecture is shown. The DSP call instruction includes an opcode field 80 and a displacement field 82. In one embodiment, opcode field 80 comprises a pair of bytes encoded as 0F E8 (in hexadecimal). Displacement field 82 may include one, two, or four bytes of displacement data to be added to the address of the DSP call instruction, thereby forming the target address.

In accordance with the above disclosure, a microprocessor has been described which detects DSP call instructions. The DSP call instructions branch to routines performing DSP functions. The microprocessor routes these DSP call instructions to a DSP, which may advantageously perform the DSP function more efficiently. If a DSP is not included, then the DSP call instruction is executed like a typical subroutine call instruction. The DSP function is performed by the microprocessor, allowing the program to operate correctly on a computer system not including a DSP.

Numerous variations and modifications will become apparent to those skilled in the art once the above disclosure is fully appreciated. It is intended that the following claims be interpreted to embrace all such variations and modifications.

What is claimed is:

1. A digital signal processing system comprising:
 a digital signal processing core; and
 a microprocessor core coupled to said digital signal processing core; wherein said microprocessor core comprises:
  an instruction cache configured to store instructions coded in a first instruction set for said microprocessor core,
  an instruction decode unit coupled to receive instructions from said instruction cache, wherein said instruction decode unit is configured to detect a DSP call instruction and generate a target address as an indication thereof, and an execute unit to execute instructions coded in said first instruction set for said microprocessor core, wherein said instruction decode unit is further configured to detect whether said digital signal processing core is enabled, and wherein said instruction decode unit is further configured to decode said DSP call instruction as a subroutine call instruction from said first instruction sat and dispatch it to said execute unit if said digital signal processing core is not enabled, thereby executing said DSP call instruction through a subroutine of instructions coded in said first instruction set for said microprocessor core; and wherein said digital signal processing core is configured to process said target address and to execute at least one instruction coded in a second instruction set for said digital signal processing core in response thereto, said at least one instruction being stored at a location in said digital signal processing core and being executed to implement a DSP function corresponding to said DSP call instruction, wherein said location in said digital signal processing core is dependent upon said target address.

2. The digital signal processing system as recited in claim 1 wherein said DSP call instruction comprises a displacement field of at least one byte, and wherein said instruction decode unit is configured to add said at least one byte to an address of a memory location storing said DSP call instruction to generate said target address.

3. The digital signal processing system as recited in claim 1 wherein said DSP call instruction comprises a displacement field as an index to a table stored in said instruction decode unit, said table being configured to store a plurality of target addresses, wherein said target address is stored within said table at said index, wherein each of said plurality of target addresses corresponds to one of a plurality of DSP program routines coded in said second instruction set for said digital signal processing core, and each of said plurality of DSP program routines executes at least one of a plurality of DSP call instructions.

4. The digital signal processing system as recited in claim 1 wherein said instruction decode unit comprises:

a decoder circuit configured to detect said DSP call instruction and to generate said target address in response thereto; and a DSP dispatch circuit, said DSP dispatch circuit being coupled to said decoder circuit to receive said target address and to convey said target address to said digital signal processing core.

5. The digital signal processing system as recited in claim 1, wherein said digital processing core is included in an I/O device, and said I/O device being configured to communicate with said microprocessor core through an I/O bus.

6. The digital signal processing system as in claim 1, wherein said digital signal processing core comprises a storage for an operand for said at least one instruction coded in said second instruction set.

7. A digital signal processing system comprising:

a microprocessor core having an instruction cache configured to store instructions coded in a first instruction set for said microprocessor core, and an instruction decode unit coupled to receive instructions from said instruction cache, wherein said instruction decode unit is configured to detect a DSP call instruction and generate a target address as an indication thereof; and a digital signal processing core coupled to said microprocessor core, wherein said digital signal processing core is configured to process said target address and to execute at least one instruction coded in a second instruction set for said digital signal processing core in response thereto, said at least one instruction being stored at a location in said digital signal processing core and being executed to implement a DSP function corresponding to said DSP call instruction, wherein said location in said digital signal processing core is dependent upon said target address, and wherein said microprocessor core and said digital signal processing core are fabricated in a single integrated circuit unit, wherein said instruction decode unit is configured to generate a different target address in response to detecting said DSP call instruction if said digital signal processing core is disabled, and wherein said microprocessor core further comprises a functional unit configured to process said different target address and to execute at least one instruction coded in said first instruction set in response thereto.

8. The digital signal processing system as recited in claim 7, wherein said microprocessor core further comprising an execute unit to execute instructions coded in said first instruction set for said microprocessor core, and wherein said instruction decode unit is further configured to detect whether said digital signal processing core is enabled, said instruction decode unit is further configured to decode said DSP call instruction as a subroutine call as a typical subroutine call instruction from said first instruction set and dispatch it to said execute unit if said digital signal processing core is not enabled, thereby executing said DSP call instruction through a subroutine of instructions coded in said first instruction set for said microprocessor core.

* * * * *

UNITED STATES PATENT AND TRADEMARK OFFICE
CERTIFICATE OF CORRECTION

PATENT NO. : 5,721,945

DATED : February 24, 1998

INVENTOR(S) : Andrew Mills, Mark A. Ireton and Thomas W. Lynch

It is certified that error appears in the above-identified patent and that said Letters Patent is hereby corrected as shown below:

```
Claim 1, col. 11, line 8, please delete the word "sat" and replace
with --set--.
```

Signed and Sealed this

Twelfth Day of May, 1998

Attest:

BRUCE LEHMAN

Attesting Officer     Commissioner of Patents and Trademarks